(12) United States Patent
Bar

(10) Patent No.: US 7,883,137 B2
(45) Date of Patent: Feb. 8, 2011

(54) HEAD FOR FUEL FILLER PIPE PROVIDED WITH AN OBTURATING ASSEMBLY

(75) Inventor: Jean-Philippe Bar, Auneuil (FR)

(73) Assignee: I.T.W. DeFRANCE, Beauchamp (FR)

( * ) Notice: Subject to any disclaimer, the term of this patent is extended or adjusted under 35 U.S.C. 154(b) by 0 days.

(21) Appl. No.: 12/529,021

(22) PCT Filed: Mar. 18, 2008

(86) PCT No.: PCT/IB2008/000631

§ 371 (c)(1),
(2), (4) Date: Aug. 28, 2009

(87) PCT Pub. No.: WO2008/117147

PCT Pub. Date: Oct. 2, 2008

(65) Prior Publication Data

US 2010/0072774 A1    Mar. 25, 2010

(30) Foreign Application Priority Data

Mar. 23, 2007    (FR) .................................. 07 53999

(51) Int. Cl.
*B62D 25/00* (2006.01)
*B65B 3/04* (2006.01)
(52) U.S. Cl. .................... 296/97.22; 141/312; 220/86.2
(58) Field of Classification Search ............. 296/97.22; 220/86.2, 746; 141/312, 382, 387
See application file for complete search history.

(56) References Cited

U.S. PATENT DOCUMENTS

| 5,291,924 | A | * | 3/1994 | Sausner et al. ............... 141/312 |
| 5,538,055 | A | * | 7/1996 | Kunz et al. .................. 141/312 |
| 5,884,958 | A | * | 3/1999 | Oddenino ................. 296/97.22 |
| 6,408,903 | B1 | | 6/2002 | Theuer et al. |
| 2006/0289083 | A1 | | 12/2006 | Bar |

FOREIGN PATENT DOCUMENTS

| DE | 19758230 A1 | 7/1998 |
| DE | 10054663 A1 | 6/2001 |
| EP | 0484642 A1 | 5/1992 |
| FR | 2710721 A1 | 4/1995 |
| FR | 1738950 A1 | 1/2007 |

OTHER PUBLICATIONS

ISR for PCT/IB2008/000631 dated Jun. 13, 2008.
French Search Report for FR 0753999 dated Oct. 4, 2007.

\* cited by examiner

*Primary Examiner*—Joseph D Pape
(74) *Attorney, Agent, or Firm*—Lowe Hauptman Ham & Berner LLP

(57) ABSTRACT

The head for a filler pipe of a vehicle tank provided with an obturating assembly includes: a body having a passage aperture; and an obturator pivoting relative to the body between an obturating position and a freeing position. The obturator is elastically biased towards the obturating position by a spring. The obturator includes a seal disposed in the obturating position between the obturator and a sealing seat that the body comprises. The head includes a hinge to pivotally mount the obturator on the body. The relative positioning between the seat and the pivotal axis defined by the hinge is fixed. The seat is flat and the obturator includes a plug provided with the seal and a flap mounted on the body by the hinge and biased by the spring with the plug which is mounted on the flap by virtue of a ball joint.

14 Claims, 4 Drawing Sheets

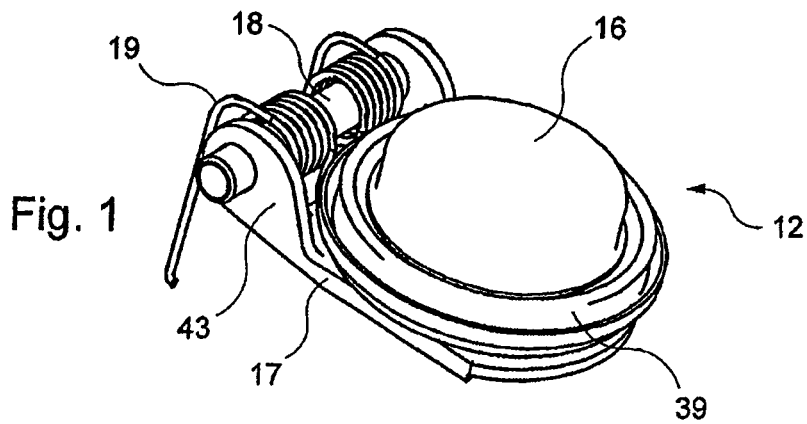
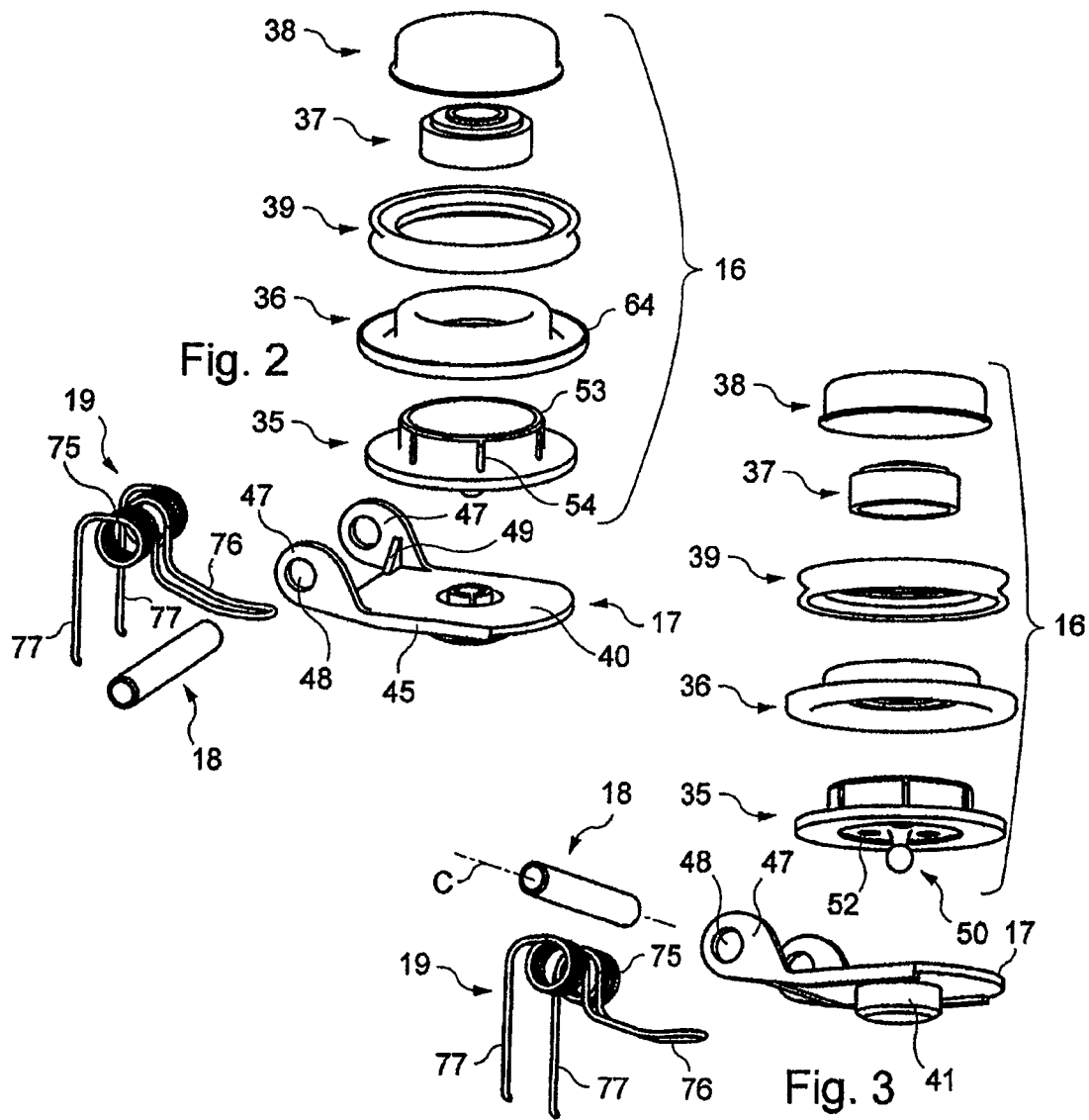

HEAD FOR FUEL FILLER PIPE PROVIDED WITH AN OBTURATING ASSEMBLY

RELATED APPLICATIONS

The present application is based on International Application Number PCT/IB2008,000631 filed Mar. 18, 2008, and claims priority from French Application Number 0753999, filed Mar. 23, 2007, the disclosures of which are hereby incorporated by reference herein in their entirety.

TECHNICAL FIELD

Background

The present invention concerns heads for a fuel filler pipe of a vehicle tank, and more particularly those provided with an obturating assembly for an aperture for passage towards the pipe of a fuel supply spout.

From the document FR 2 860 454 such a pipe head is known of which the obturating assembly comprises a body having a passage aperture and an obturator pivoting relative to that body between an obturating position in which is conceals the orifice and a freeing position in which it does not conceal it.

This obturator is biased towards the obturating position by spring means and it is adapted to be driven by the spout from the obturating position towards the freeing position when that spout encounters the obturator during a pushing-in movement of the spout into the head.

This obturator comprises a seal which is disposed between the obturator and a corresponding conical sealing seat that the body comprises when the obturator is in obturating position.

The seal/seat cooperation along a conical surface requires precise centering of the obturator when it comes into obturating position.

This centering is made possible by play provided at the hinge for pivoting the obturator. The hinge is formed by a pivoting shaft passing through oblong holes of eyelets that the obturator comprises. Play exists due to the fact that the diameter of the shaft is smaller than the diameter of the hole of the eyelets. The obturator can thus move in a direction extending at a right angle relative to the shaft and in a radial plane, through a distance which corresponds to the difference between the diameter of the shaft and the inner diameter of the oblong holes. As the obturator is not prevented from movement on the pivoting shaft, it can move in the longitudinal direction of the shaft. Furthermore the oblong shape of the eyelets permits movement in the general pushing-in direction of the spout.

SUMMARY

The invention concerns the provision of a head of the same kind, that has improved performance in particular in terms of simplicity and convenience of procurement.

To that end it provides a head for a fuel filler pipe of a vehicle tank provided with an obturating assembly comprising:

a body having an aperture for passage to said pipe of a fuel supply spout; and
an obturator pivoting relative to said body between an obturating position in which it conceals said passage aperture and a freeing position in which it does not conceal said passage aperture, said obturator being elastically biased towards said obturating position by spring means, said obturator being adapted to be driven by said spout from the obturating position to the freeing position when said spout meets said obturator during a thrusting movement of said spout into said head, said obturator comprising a seal disposed, in said obturating position, between said obturator and a sealing seat that said body comprises, said head comprising a hinge for pivotally mounting said obturator on said body, characterized in that the relative positioning between said seat and the pivotal axis defined by said hinge is fixed, said seat being flat and said obturator comprising a plug provided with said seal and a flap mounted on said body by means of said hinge and biased by said spring means with said plug which is mounted on said flap by virtue of ball joint means.

Even if the axis of the hinge is not perfectly aligned parallel to the plane in which the sealing seat extends or disposed at a specific distance enabling the flap to be presented in obturating position parallel to that plane, by virtue of the ball joint, the plug orientates itself, by the seal/seat contact independently of the flap and by virtue of the ball joint, parallel to the seat. Thus the seal is correctly positioned against the seat to ensure sealing. The simplicity of arrangement of the members of the head render the assembly more economic.

The modification of positioning to enable the sealing seal/seat contact is limited to the plug such that the force provided by the spring is also limited.

Furthermore, by virtue of the flatness of the seat, the existence of a slight offset of the seal in the plane of the seat does not prevent the seal/seat contact from occurring in contrast to the case of the conical seat in which the slightest offset in that plane prevents the contact from occurring.

According to features of implementation that are particularly simple and convenient both with respect to manufacture and use:

said ball joint means are centered relative to said seal;
said ball joint means comprise a projection with a spherical head as well as a hollow hub adapted to captively receive said spherical head;
said plug comprises said projection whereas said flap comprises said hub;
said plug comprises apertures and a ventilation valve adapted to balance the internal pressure of said head with the external pressure;
said flap comprises said projection whereas said plug comprises said hub;
the general orientation of said flap and the general orientation of said seal may be inclined relative to each other with an angle of inclination less than or equal to 5°.
said seal and said seat are circular;
said seal comprises two sealing lips spaced apart from each other in the axial direction of said seal;
said lips extend in an inwardly pointing V-shape;
said flap comprises two parallel lugs spaced apart from each other and each provided with an aperture through which extends a journal engaged with a support fixed relative to said body, said journal and said lugs forming said hinge.
said journal extends at the periphery of said passage aperture generally parallel to the main plane along which said seat extends;
said spring means comprise a torsion spring having a portion wound around said journal and a portion positioned against said flap to bias said obturator towards its obturating position;

the diameters of said flap, of said apertures of said lugs and of holes comprised by said support to receive said journal are adapted for mounting without play of said flap on said body;

BRIEF DESCRIPTION OF THE DRAWINGS

The features and advantages of the invention will appear from the following description, given by way of preferred but non-limiting example, with reference to the accompanying drawings in which:

FIG. 1 is a perspective view of the obturator according to the present invention;

FIG. 2 is an exploded view of the end obturator of FIG. 1;

FIG. 3 is a view similar to that of FIG. 2, taken from another angle;

DETAILED DESCRIPTION OF EMBODIMENTS

Figure 4:
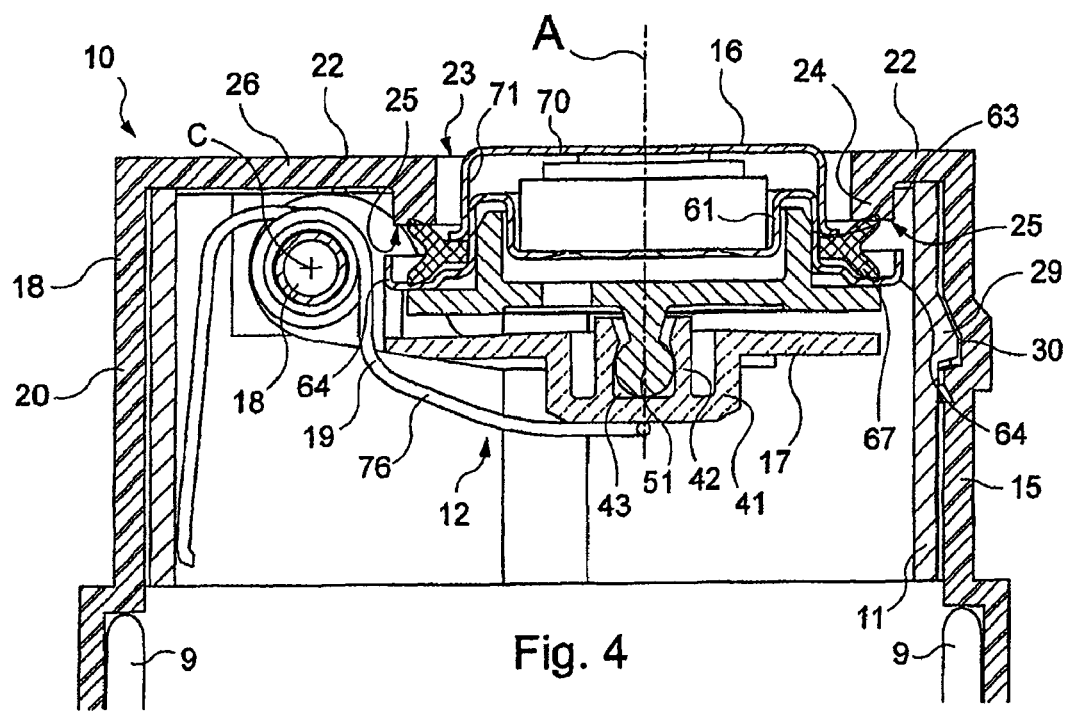
FIG. 4 is a view in axial cross-section of the head for a pipe, the obturator being represented in obturating position, with the flap which comprises the hub receiving the ball joint ball that the plug comprises.

The head 10 illustrated in the drawings is provided to be fitted like a sleeve and mechanically held onto an end of a fuel filler pipe 9 (FIGS. 4 to 6) of a vehicle tank (not shown) disposed at the other end of the pipe 9 (only a portion of the pipe 9 situated in the neighborhood of the head 10 is illustrated in FIG. 4).

The head 10 comprises an obturating assembly. In the embodiment represented, the head 10 merges with the obturating assembly. According to a variant not represented, the head also comprises an access assembly for a spout, that is mounted upstream of the obturating assembly.

In the obturating position illustrated in FIG. 4, the obturating assembly obturates the pipe 9 whereas, from its obturating position it can enable the passage, by a simple thrusting movement, of a spout of a fuel supply nozzle (not shown), in order to attain a freeing position (FIG. 5), in which the distal end of the spout communicates with the internal space of the pipe.

This obturating assembly is provided to be fitted like a sleeve onto the end of the pipe 9.

This assembly comprises an obturation support 11, a main body 15, a flap obturator 12 comprising a plug 16 and a flap 17, a journal 18 for hinging of the obturator and a return spring 19 for the obturator. The flap 17 is of relatively rigid plastics material molded as a single piece and the plug 16 is of plastics material.

The main body 15 is of relatively rigid plastics material molded as a single piece. It has a side wall 20 the general form of which is tubular with a circular section. Within the side wall 20 there is disposed an end wall 22 of which the periphery is joined to an end of the side wall.

As represented in FIG. 4, the wall 20 continues with a section of slightly larger diameter for fitting like a sleeve onto the pipe 9. According to a variant not represented, the head is welded to the pipe.

In the wall 22 there is provided an aperture 23 serving for the passage of the spout. On the perimeter of the aperture 23, the wall 22 has an inwardly extending peripheral rim 24 which terminates with a surface forming a seat 25. The seat 25 is an flat annular surface extending parallel to the wall 22 and serves for the obturator, which serves to close the aperture 23. The seat is flat which means that it is comprised in a plane but that also includes surfaces which are not strictly planar and which have possible variations in terms of flatness. The flat seal is, in any case, by contrast to a conical seal.

The center of the aperture 23 is radially offset such that the portion 22 has a crescent moon shape with the two fine ends meeting in the immediate proximity of the side wall 20 (to the right in FIG. 4). Diametrically opposite, there is a wide portion 26 of wall 22 (to the left in FIG. 4).

The obturation support 11, on the outside, in the vicinity of its free end, comprises bosses 29 for snap fitting (FIG. 4) with the body 15 of which the wall 20 has, facing the bosses 29, housings 30 in the form of cut-outs adapted to cooperate with the bosses 29.

The plug 16 comprises a base 35 and a hat 36 fitted over the base 35 so as to nest therewith, and further comprises a part with a valve 37 and a cap 38 with an annular seal 39 disposed between the hat 36 and the cap 38. When the plug 16 is formed with all these members, the axes of all the members coincide with the main axis A of the plug 16.

The seal 39 is of elastomer plastics material molded as a single piece. The base 35, the hat 36, the part with a valve 37 and the cap 38 are each of relatively rigid plastics material molded as one piece.

The flap 17 has a plate 40 of rectangular general shape with the exception of on the of the sides which has the shape of an arc of a circle. At the center of the plate 40, there is an opening which opens onto a cylindrical recess delimited by a cylindrical wall 41 having a closed end. From the end of that wall 41 there extends, towards the opening and beyond, three hub forming arms 42, each arm 42 generally corresponding to a third of a cylinder.

The three arms 42 are disposed around an imaginary cylinder. In axial cross-section (FIG. 4), each arm 42 has an external side parallel to the axis of that imaginary cylinder whereas the internal side has, towards the free end of the arm 42, a very flat inwardly pointing V-shape. Thus, the space provided between the arms 42 and limited one side by these points and on the other by the end of the wall 41, forms a housing 43 adapted to receive a spherical form.

The two edges that are adjacent to the edge of the plate 40 shaped as an arc of a circle each have, on the side from which projects the wall 41, a reinforcing rib over its full length.

Transversely to the plane of the plate 40 and extending onwards from the ribs 45, the flap 17 comprises two flat lugs 47, each having a circular aperture 48 for the journal 18. At the side of each lug 47 that faces the other lug 47, a triangular reinforcing member 49 is disposed transversely to the plate 40 and to the lugs 47.

The base 35 is circular overall and flat. On one side at its center and extending along its axis A, it has a projection 50 with a spherical head 51 disposed at its free end with the diameter of the spherical head 51 generally corresponding to half the height of the projection 50. The dimensions of the spherical head 51 are adapted such that it can be accommodated in the housing 43 of the flap 17.

The base 35 comprises three ventilation apertures 52 evenly spaced around the projection 51. The apertures 52 are circular and emerge on the side having the projection 50 on a surface that is slightly recessed relative to the general surface of the base 35 on the projection 50 side. To be precise, there is a recess also of circular shape around the projection 50.

On the opposite side from the projection 50, the base 35 has a cylindrical wall 53 of which the height generally corresponds to that of the projection 50 and which extends transversely of the plane in which the base 35 generally extends. The axis of the wall 53 and that of the base 35 coincide with the axis A. The wall 53 has axial ribs 54 evenly spaced on its outer surface. The inner diameter of the wall 53 corresponds to the diameter of the recess provided on the opposite surface of the base 35. The plane in which the surface of the base 35 within the wall 53 extends is slightly proud with an offset corresponding to the recessed offset to be found on the opposite side such that the thickness remains the same despite the existence of the recess.

The hat 36 is a solid of revolution, having the same axis A, and having a lesser thickness than that of the base 35 or than that of the flap 17.

The hat 36 has a circular central back wall 60 on the periphery of which an internal side wall 61 extends transversely, which is radially extended by an annular wall 62 which is itself extended by an external side wall 63 parallel to the internal side wall 61. Wall 63 is higher than wall 61 such that the end of wall 63 is spaced away from the plane comprising wall 60. Starting from the end of that wall 63, the hat 36 has a rim 64 extending radially outwards and having a difference in level at generally half way, such that the annular portion furthest from the wall 63 is still a little further away from the plane comprising the wall 60. Rim 64 ends with a wall which extends transversely towards the plane comprising the crown 60.

Seal 39 is annular and is Y-shaped in axial cross-section with the central leg corresponding to an annular portion 66 of which the inner diameter corresponds to the outer diameter of wall 63 and with the two open arms corresponding to two sealing lips 67, 68 which are obliquely disposed to each other.

The part with a valve 37 is a hollow cylindrical part of which the height generally corresponds to the height of the wall 63 and of which the outer diameter is slightly less than the inner diameter of the wall 61. The end wall of part 37 is disposed on the wall 60.

Part 37 comprises a ventilation valve, not shown, which makes it possible to balance the pressure within the pipe with the external pressure, if necessary.

The cap 38 is also a solid of revolution of which the thickness corresponds to that of the hat 36 and which has the shape of an overturned bowl with a circular end wall 70 from the periphery of which projects a side wall 71 the height of which is generally the same as that of the wall 63. Wall 71 has three evenly spaced holes (not shown in the drawings). Wall 71 ends with an outward rim. The corners between the end 70 and the wall 71 and the corner formed at the rim of wall 71 are rounded.

For putting the plug 16 in place, the hat 36 is fitted onto the base 35 so as to nest therewith, in particular by virtue of the ribs 54 of wall 53. The seal 39 is positioned on the hat 36 with lip 67 coming against the deepest portion of rim 64. Part 37 is positioned on wall 60 of hat 36 then the cap 38 is fitted on so as to nest, the end 70 thereof abutting part 37 and the side wall 71 thereof coming into contact with wall 63 of hat 36. The rim of the side wall 71 with the contours of rim 64 in the portion thereof joining wall 63 traps the seal 39 between the hat 36 and the cap 38.

To form the obturator 12, the plug 16 is fixed by snap-fitting onto the flap 17 by placing the spherical head 51 of the projection 50 in the housing 43. By virtue of this ball joint connection, the plug 16 and the flap 17 are adapted to be inclined a few degrees relative to each other. The plate 40 extends according to an axis B which, in normal operation, coincides with the axis A of all the members of the plug 16 that is to say that the plate 40 and the tray 35 are parallel as are the end walls 70 and the wall 60. Due to the form in particular of the arms 42, the flap 17 may be inclined relative to the plug here up to 5°. This angle of inclination is also found between axis A and axis B.

The hinge pin 18 is of steel here. Its general form is that of a small solid rod of circular section.

The spring 19 is of spring steel here. It comprises a central helical portion 75 with two aligned windings. A hairpin portion 76 projects on one side between the two windings and two arms 77 project at both ends of portion 75.

In the assembled condition, the journal 18 is disposed in holes 78 comprised by the body 15 as well as within the helical portion 75 of the spring 19, which portion 75 is disposed between the lugs 47. The journal 18 is mounted in these members with neither radial nor axial play, such that it may possibly turn on its axis C but cannot move radially or axially relative to the axis C when it is in its specific assembly position.

The journal 18 is provided to be mounted with its axis C parallel to the plane of seat 25 and at a specific distance making it possible for the axis B of the flap 17 and the axis A of the plug, in obturating position, to coincide transversely with the seat 25.

Figure 7:
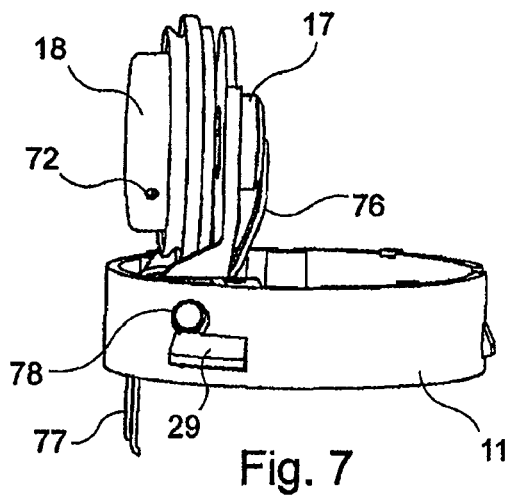
FIG. 7 is a view in perspective of the obturating assembly before positioning of that assembly on the end of the pipe.
Figure 8:
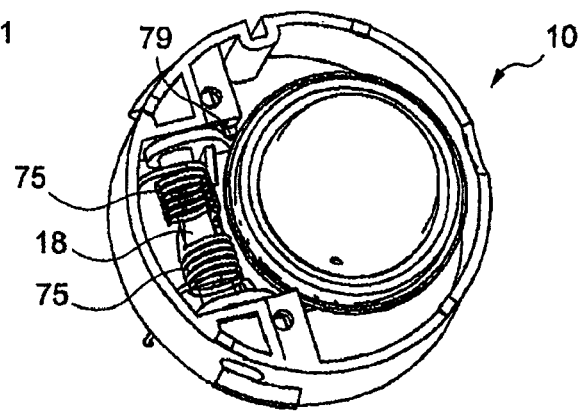
FIG. 8 is a view similar to that of FIG. 7, taken from another angle and with the obturator in obturating position.

With reference to FIG. 7, the obturator 12 is mounted in the support 11 transversely thereto. Next (FIG. 8) the obturator 12 is placed in obturating position 10 and temporarily held by three evenly spaced clips 79.

The obturating assembly is then mounted on the body 15 by snap fitting by virtue of the bosses 29 and housings 30.

Portion 75 and the apertures 48 of the lugs 47 each have an axis which coincides with the axis C of the journal 18. In more general terms, the axis C is the pivotal axis which is defined by the hinge for pivoting the obturator 12 relative to the body 15, the pivotal hinge comprising the journal 18, the spring 19 and the lugs 48.

In obturating position, when the axis of the journal 18 is properly positioned and the manufacturing tolerances respected, the flap 17 and the plug 16 are parallel to each other that is to say that their axes A, B coincide. Furthermore, the seal 39 is positioned against the seat 25 so as to provide sealing with the spring 19 which urges the obturator and thus the seal 39 against the seat 25.

Figure 5:
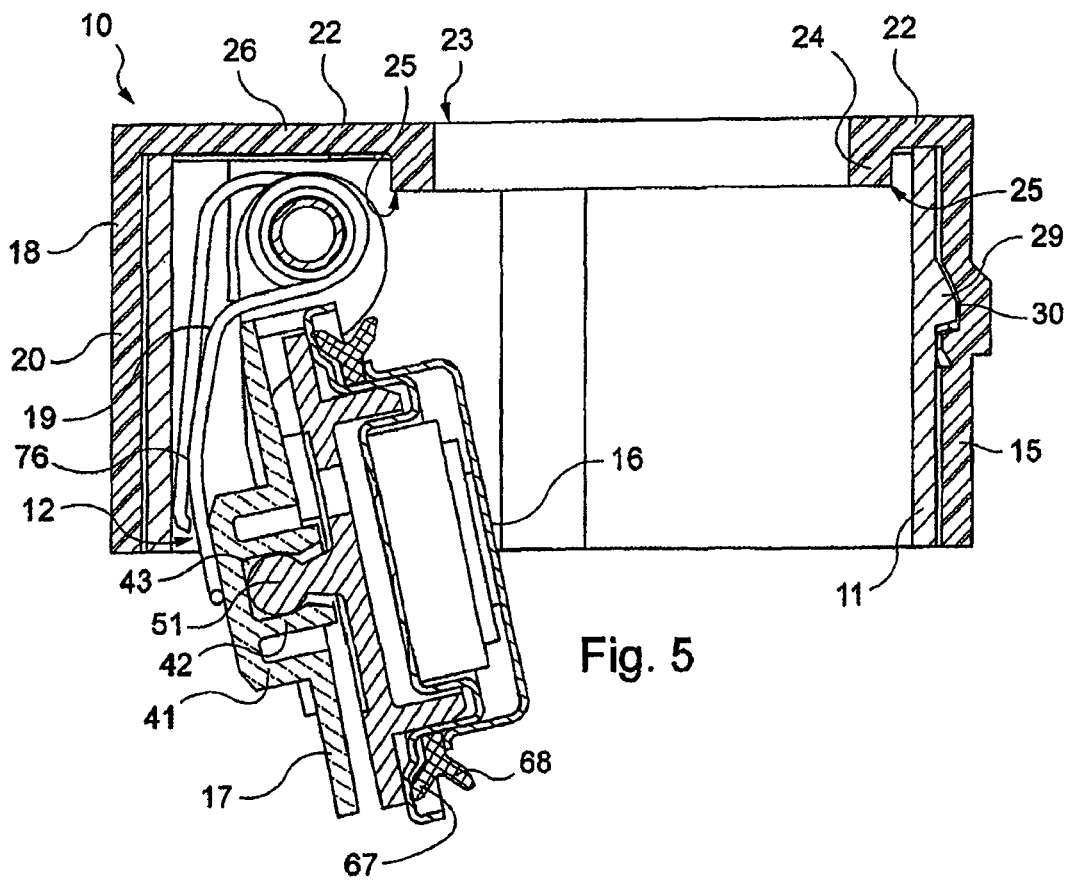
FIG. 5 is a view similar to that of FIG. 4, with the obturator in freeing position.
Figure 6:
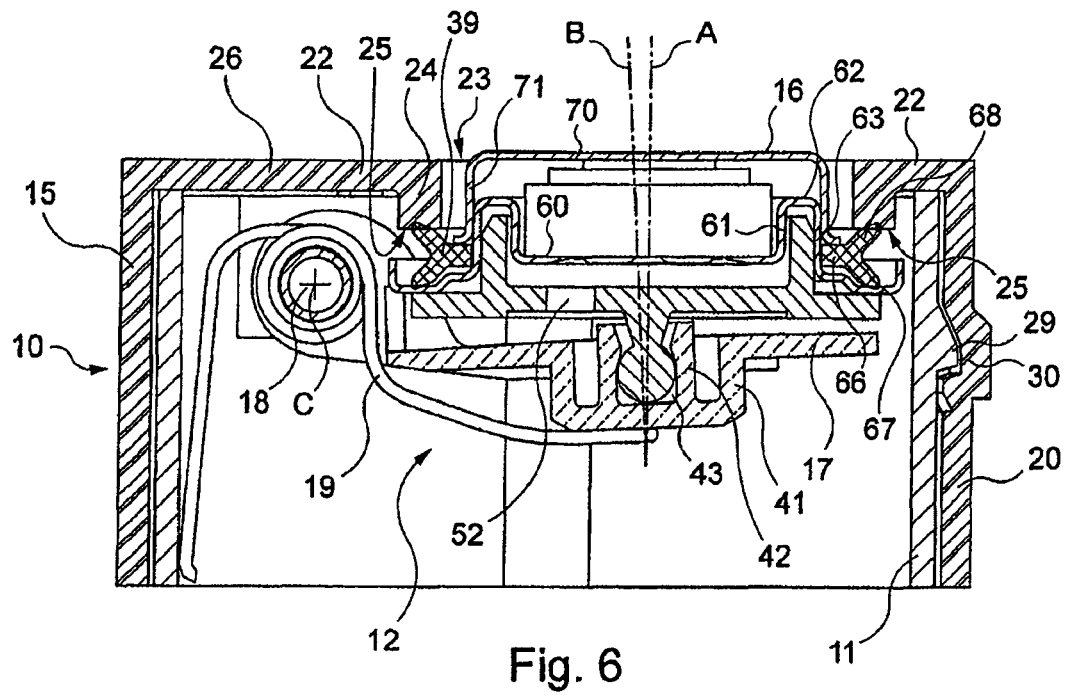
FIG. 6 is a view similar to that of FIG. 4 in which the flap is inclined relative to the plug.

When a spout (not shown) is pushed in, it drives the obturator 12 to the freeing position (FIG. 5). And when the spout is withdrawn, the obturator is again urged into obturation.

In the case (FIG. 6) in which the journal 18 is positioned slightly below the position in which it is provided for it to be for positioning parallel to the flap 17 and to the plug 16 (FIG. 4), the spring 19 urges the flap from the freeing position to the obturating position through a greater angular travel such that the plug 16 is not presented parallel to the seat 25. By virtue of the ball joint, play is taken up and the seal 39 comes into position against the seat while remaining parallel against that seat 25. Thus the flap 17, which is fastened to the spring 19, reaches obturating position with an angular offset of a few degrees relative to the case in FIG. 4 but the plug 16 is able to stop its angular travel when the seal 39 comes into position parallel to and against the seat 25. The plane in which the flap 17 extends has an angle of inclination of a few degrees relative to the main plane of the plug 16. This same angle of inclination is also found between axis A of the projection 50 and axis B of the flap 17.

The seal 39 retains the same positioning relative to the seat 25 such that in the absence of offset of the journal 18, the force exerted by the spring 19 on the obturator and thus on the seal 39 does not need to be high to compensate for that offset. It is in particular not necessary to crush the seal 39 to compensate for defects in positioning or orientation of the hinge axis. Furthermore, as the force necessary to obtain fluid-tightness is very limited, the force provided by the user to make the obturator 12 pass from the obturating position to the freeing position is very moderate.

During the period of use of the head, the material of the head and in particular the material of the seal may absorb fuel vapors, which results in the parts swelling. For the seal 39, this means that its diameter increases. As the seat 25 is flat, the seal/seat contact is not altered by the swelling of the seal 39.

The washer shape of the seat also gives the advantage that if the seal 39 is not perfectly centered relative to the seat 25 when it comes into obturating position, the sealing contact is nevertheless achieved. It is thus not necessary to provide automatic centering or take-up of play for the obturator.

Another advantage of the head 10 lies in that on assembly, as all the parts of the plug are solids of revolution, no foolproofing has to be provided to give a specific angular position to the different parts.

The case is illustrated here in which the journal 18 is positioned below the intended position but the take-up of play by the ball joint also operates if the journal 18 is positioned above, if it is not oriented perfectly transversely to the axis of the pipe or if certain tolerances of the different components of the obturator assembly are exceeded. In general terms, these tolerances may furthermore be provided to be larger due to the existence of that ball joint.

Figure 9:
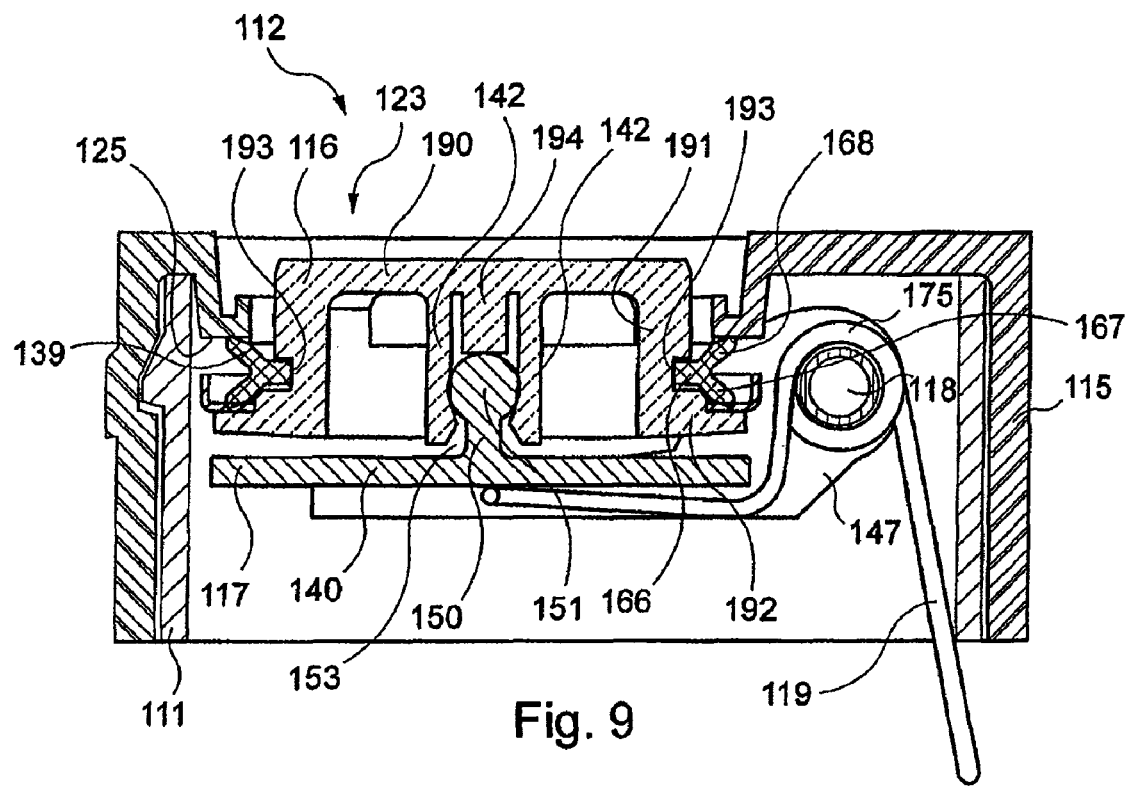
FIG. 9 is a view in cross-section of the head for a pipe according to another embodiment, the obturator being represented in obturating position, with the plug which comprises the hub receiving the ball joint ball that the flap comprises.
Figure 10:
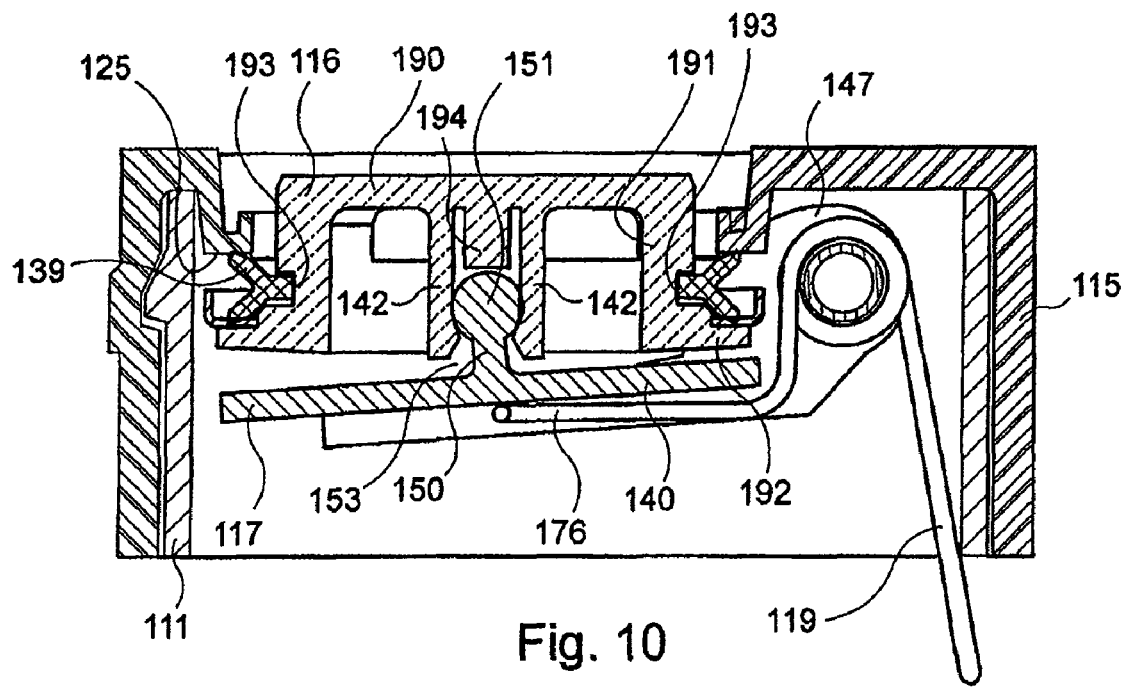
FIG. 10 is a view similar to that of FIG. 9 in which the flap is inclined relative to the plug.

With reference to FIGS. 9 to 10, a pipe head according to another embodiment will now be described. For similar parts the same numerical references have been kept as earlier, but increased by 100.

According to this embodiment, it is the flap 117 that comprises the projection 150 with a spherical head 151 and the plug 116 that comprises the hub adapted to receive the spherical head 151.

The plate 140 has no recess but only the projection 150.

The plug 116 is molded in one piece and has the form of a hollow cylindrical shell. It has an end 190 on the side remote from the flap 117 and a cylindrical wall 191 at the free end of which a transverse rim 192 extends. The rim 192 extends outwardly and has a shoulder such that it is thicker in the vicinity of the wall 191. In the vicinity of that rim 192, on the outer surface of the cylindrical wall 190 there extends a groove 193. The groove 193 and the rim 192 are provided for the fixing of the seal 139 of which the annular portion 166 is positioned in the groove 193 whereas the lip 167 abuts the rim 192 and the lip 168 is adapted to abut the seat 125.

In the interior space of the plug 116, there extend from the end 190 three hub forming arms 142 and a central projection 194 delimiting a housing 143 for receiving the spherical head 151.

As in the preceding embodiment, this ball joint permits the flap 117 to be inclined a few degrees relative to the plug 116.

According to another embodiment, the angle of inclination is greater and the flap may be inclined 10° relative to the plug.

According to another embodiment, the valve part comprises a safety valve.

According to another embodiment, the pipe head comprises an access assembly forming one piece with the body of the obturating assembly, this access assembly having an aperture for the spout to pass through upstream of the obturating assembly in the thrusting direction of the that spout.

According to another embodiment, the seal is toric and of circular section.

According to another embodiment, the body 15, the plug 16, the flap 17, the hat 36 and the cap 38 are metallic.

The invention claimed is:

1. A head for a fuel filler pipe of a vehicle tank provided with an obturating assembly comprising:
   a body having an aperture for passage to said pipe, of a fuel supply spout; and
   an obturator pivoting relative to said body between an obturating position in which it conceals said passage aperture and a freeing position in which it does not conceal said passage aperture, said obturator being elastically biased towards said obturating position by spring means, said obturator being adapted to be driven by said spout from the obturating position to the freeing position when said spout meets said obturator during a thrusting movement of said spout into said head, said obturator comprising a seal disposed, in said obturating position, between said obturator and a sealing seat that said body comprises, said head comprising a hinge for pivotally mounting said obturator on said body, characterized in that the relative positioning between said seat and the pivotal axis defined by said hinge is fixed, said seat being flat and said obturator comprising a plug provided with said seal and a flap mounted on said body by means of said hinge and biased by said spring means with said plug which is mounted on said flap by virtue of ball joint means.

2. A head according to claim 1, characterized in that said ball joint means are centered relative to said seal.

3. A head according to claim 1, characterized in that said ball joint means comprise a projection with a spherical head as well as a hollow hub adapted to captively receive said spherical head.

4. A head according to claim 3, characterized in that it is said plug that comprises said projection whereas said flap comprises said hub.

5. A head according to claim 4, characterized in that said plug comprises apertures and a ventilation valve adapted to balance the internal pressure of said head with the external pressure.

6. A head according to claim 3, characterized in that it is said flap that comprises said projection whereas said plug comprises said hub.

7. A head according to claim 1, characterized in that the general orientation of said flap and the general orientation of said seal may be inclined relative to each other with an angle of inclination less than or equal to 5°.

8. A head according to claim 1, characterized in that said seal and said seat are circular.

9. A head according to claim 1, characterized in that said seal comprises two sealing lips spaced apart from each other in the axial direction of said seal.

10. A head according to claim 1, characterized in that said lips extend in an inwardly pointing V-shape.

11. A head according to claim 1, characterized in that said flap comprises two parallel lugs spaced apart from each other and each provided with an aperture through which extends a journal engaged with a support fixed relative to said body, said journal and said lugs forming said hinge.

12. A head according to claim 1, characterized in that said journal extends at the periphery of said passage aperture generally parallel to the main plane along which said seat extends.

13. A head according to claim 11, characterized in that said spring means comprise a torsion spring having a portion wound around said journal and a portion positioned against said flap to bias said obturator towards its obturating position.

14. A head according to claim 11, characterized in that the diameters of said flap, of said apertures of said lugs and of holes comprised by said support to receive said journal are adapted for mounting without play of said flap on said body.

* * * * *